United States Patent [19]
Howell et al.

[11] Patent Number: 6,049,454
[45] Date of Patent: Apr. 11, 2000

[54] COMPUTER MONITOR STAND AND DOCKING METHOD

[75] Inventors: Bryan Howell; Orin Ozias; Bryan Hunter, all of Austin, Tex.; Peter Skillman, San Carlos, Calif.; John W. Lai, San Francisco, Calif.; Traci Angela Neist, Palo Alto, Calif.

[73] Assignee: Dell Computer Corporation, Round Rock, Tex.

[21] Appl. No.: 09/060,793

[22] Filed: Apr. 15, 1998

[51] Int. Cl.[7] .......................... H05K 5/00; G02F 1/1333; G02F 1/3335
[52] U.S. Cl. .......................... 361/686; 361/681; 361/682; 361/683; 361/727; D6/396
[58] Field of Search .................................. 361/686, 681, 361/682, 683, 680, 725–727, 741, 754, 756; D6/396, 397; D14/100, 114

[56] References Cited

U.S. PATENT DOCUMENTS

| | | |
|---|---|---|
| D. 362,246 | 9/1995 | Evenson et al. |
| D. 363,621 | 10/1995 | Eatherly . |
| D. 367,477 | 2/1996 | Rosen ........................... D14/114 |
| 4,438,458 | 3/1984 | Munscher ..................... 358/254 |
| 4,903,222 | 2/1990 | Carter et al. ................. 364/708 |
| 4,958,737 | 9/1990 | Auerbach .................... 206/557 |
| 5,229,920 | 7/1993 | Spaniol et al. .............. 361/393 |
| 5,323,291 | 6/1994 | Boyle et al. ................. 361/683 |
| 5,450,271 | 9/1995 | Fukushima et al. ......... 361/686 |
| 5,488,572 | 1/1996 | Belmont ................. 364/514 R |
| 5,561,589 | 10/1996 | Mesfin et al. ............... 361/686 |
| 5,745,341 | 4/1998 | Wolff et al. ................. 361/682 |

*Primary Examiner*—Leo P. Picard
*Assistant Examiner*—Anatoly Vortman
*Attorney, Agent, or Firm*—Haynes & Boone, L.L.P.

[57] ABSTRACT

A computer monitor stand and method according to which a lower support member receives a docking device and a portable computer to enable the computer to be docked to the docking device. An upper support member includes a plate for receiving the monitor, and one or more feet extend between the plate and the docking device. The feet are detachably connected to the plate or the docking device to enable the feet to be changed to adjust the position of the plate and therefore the monitor. This enables a preferred monitor viewing angle to be maintained despite use with different-sized docking stations.

23 Claims, 2 Drawing Sheets

COMPUTER MONITOR STAND AND DOCKING METHOD

Many of the docking devices include a monitor stand that extends over the docking device and receives the monitor. The monitor stand typically has four legs that engage the desktop to transmit the monitor load to a solid surface. However, these arrangements lend themselves to problems. For example, a typical monitor stand raises the viewing height of the monitor significantly from the desktop, resulting in poor ergonomic positioning relative to the user. Also, these stands are usually not adjustable so as to be able to accommodate different-sized docking devices or to adjust the monitor viewing height. Further, the stands are often difficult and expensive to manufacture and assemble. Still further, typical one-piece monitor stands are fabricated from plastic which must be relatively thick because of the plastic ribbing required to reinforce the structure. This inherent thickness in the stand raises the monitor even higher above the portable computer causing poor ergonomic positioning relative to the user, as discussed above. Other stands employ both metal and plastic, but require snaps and/or screws which adds to the difficultly and cost of manufacture.

Therefore, what is needed is a monitor stand for use with a docking device for a portable computer according to which the viewing height of the monitor is adjustable by the user to accommodate different docking devices and/or to obtain an optimum position from an ergonomic standpoint. Also, what is needed is a monitor stand of the above type that can be fabricated of a relatively thin metal and is fairly easy and inexpensive to manufacture.

SUMMARY

Accordingly the present disclosure is directed to a monitor stand for use with a docking device for a portable computer and includes a lower support member that receives the docking device and the portable computer to enable the computer to be docked to the docking device. An upper support member includes a plate for receiving the monitor, and one or more feet extend between the plate and the docking device. The feet are detachably connected to the plate or the docking device to enable the feet to be changed to adjust the position of the plate and therefore the monitor.

As a result, a preferred monitor viewing angle can be maintained despite use with different-sized docking stations, or the viewing angle can be changed using the same docking device.

DESCRIPTION OF THE PREFERRED EMBODIMENT

Figure 1:
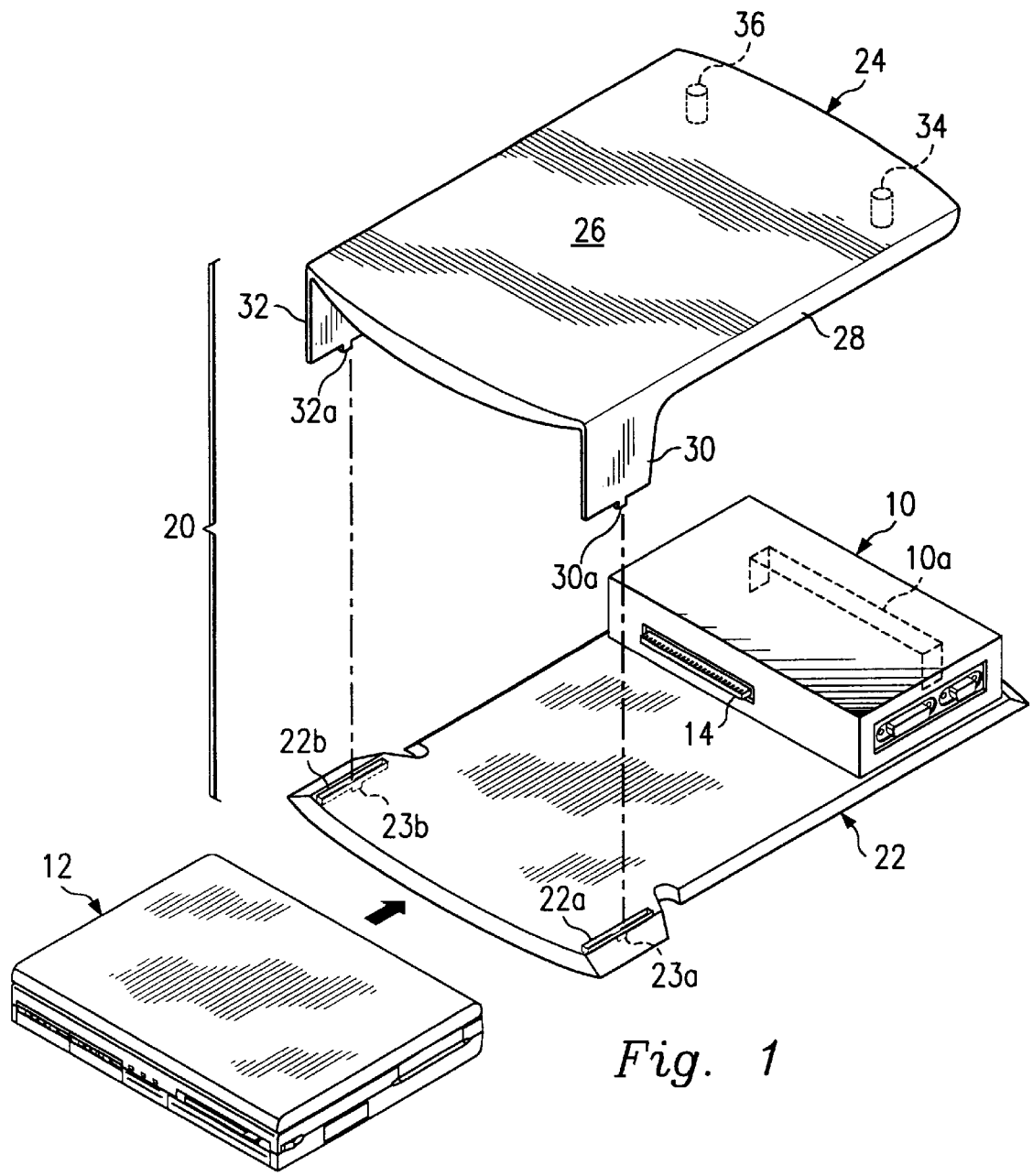
FIG. 1 is an exploded, isometric view of the monitor stand of the present disclosure along with a docking device and a portable computer.

Referring to FIG. 1 of the drawings, the reference numeral 10 refers in general to a docking device, which may be in the form of a docking station, a port replicator, or any similar device. The docking device 10 is adapted to receive a portable computer 12, in the form of a laptop computer, a notebook computer, or the like, in a manner to be described. To this end a connector 14 is provided on the front face of the docking device 10 which is adapted to engage a corresponding connector (not shown) on the rear face of the portable computer 12 to mechanically and electrically connect the portable computer to the docking device. It is understood that the rear face of the docking device 10 is provided with similar connectors for connection, via standard cables, to peripheral equipment, such as, monitors, printers, modems, etc. This enables the portable computer 12 to be easily interfaced with the latter equipment via the docking device 10 so that the portable computer can quickly be adapted for office use. Since all of these connectors, including the connector 14, are conventional they will not be described in detail.

The monitor stand of the present disclosure is shown in general by the reference numeral 20 and includes a lower support member, or tray, 22 and an upper support member 24. The rear end portion of the lower member 22 is adapted to receive the docking device 10. In this context it is understood that one or both of the lower member 22 and the docking device 10 can be provided with tabs, slots, rails, or the like to guide and retain the docking device 10 in the specific location shown, i.e., with the rear end of the device 10 extending approximately flush with the rear end of the lower support member 22, and with the docking device 10 substantially centered transversely with respect to the stand member.

A pair of relative long slots 22a and 22b are provided near the front end of the lower support member 22 near its respective sides, and a pair of relative short slots 23a and 23b are provided in the support member just below the slots 22a and 22b, respectively, for reasons to be described. The lower support member 22 is preferably fabricated from a molded plastic material.

The upper support member 24 of the stand 20 is in the form of a flat plate 26 having two sidewalls 28. A pair of legs 30 and 32 extend downwardly, as viewed in FIG. 1, from the plate 26 near the front end thereof, and the legs have tabs 30a and 32a, respectively, extending downwardly therefrom. The plate 26, the sidewalls 28, the legs 30 and 32, and the tabs 30a and 30b are preferably fabricated integrally from relatively thin metal stock.

A pair of feet 34 and 36 are attached to lower surface of the plate 26 near the rear end thereof. The attachment of the feet 34 and 36 to the plate 26 can be done in any conventional manner that permits the feet to be easily removed and replaced by other feet for reasons to be described. For example, a central bore could be provided through each of the feet 34 and 36 which receives a bolt which threadedly engages in a threaded socket formed in the plate 26. Alternatively, the feet 34 and 36 themselves could be provided with external threads which threadedly engage in a corresponding threaded socket formed in the plate 26.

The docking device 10 is provided with an internal reinforcing support member, in the form of a bridge 10a, which, in the assembled portion of the stand 20, extends directly underneath the feet 34 and 36. The bridge 10a is designed to transfer the load from the stand 20, and more specifically, from a monitor resting on the stand, to the support structure, such as a desktop, or the like, on which the stand rests. It is understood that additional reinforcing support members, in the form of additional bridges, or the like, can be provided in the docking device. For example, two bridges similar to bridge 10a can be provided that extend from front-to rear in the enclosure of the device 10 and directly underneath the feet 34 and 36, respectively.

To prepare the docking device 10 for use, the lower support member 22 is placed on a support surface, such as a tabletop. The docking device 10 is placed on the rear end portion of the lower support member 22 and can be guided and/or retained in this position in the manner discussed above. The upper support member 24 is assembled to the lower support member 22 by lowering the upper member relative to the lower member until the legs 30 and 32 extend in the slots 22a and 22b, respectively; and the tabs 30a and 32a extend in the slots 23a and 23b, respectively. In this position the feet 34 and 36 rest on the upper surface of the docking device 10, as shown in FIG. 2.

The portable computer 12 is then advanced towards the stand 20 and the docking device 10, with the legs 30 and 32 of the stand 20 functioning to guide and center the portable computer laterally with respect to the docking device. In this context it is understood that one or both of the lower support member 22 and the portable computer 12 can be provided with tabs, slots, rails, or the like to guide the portable computer until it reaches the portion of FIG. 2 and its connectors engage the connectors 14 of the docking device 10.

Figure 2:
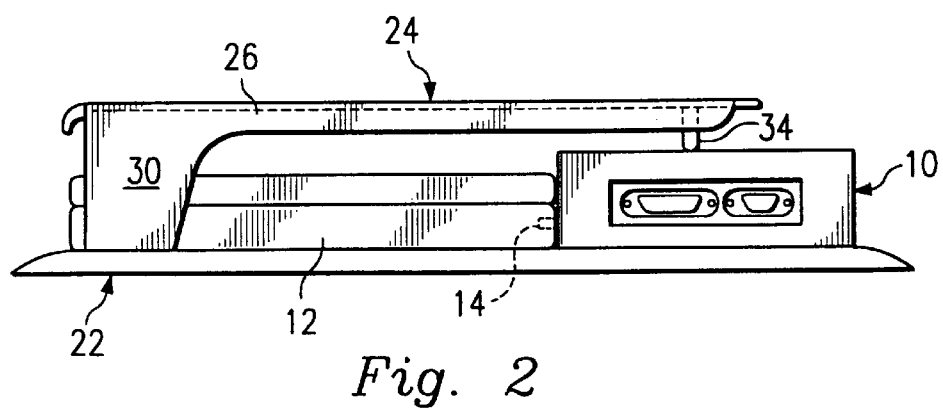
FIG. 2 is a side elevational view showing the stand, the docking device, and the computer of FIG. 1.

It is noted from FIG. 2 that in the assembled position of the docking device 10 and the stand 20, the upper surface of the plate 26 extends in a substantially horizontal position which is preferred from an ergonomic standpoint. To achieve this horizontal position of the plate 26, the height of the legs 34 and 36 are selected in relation to the height of the docking device 10.

Figure 3:
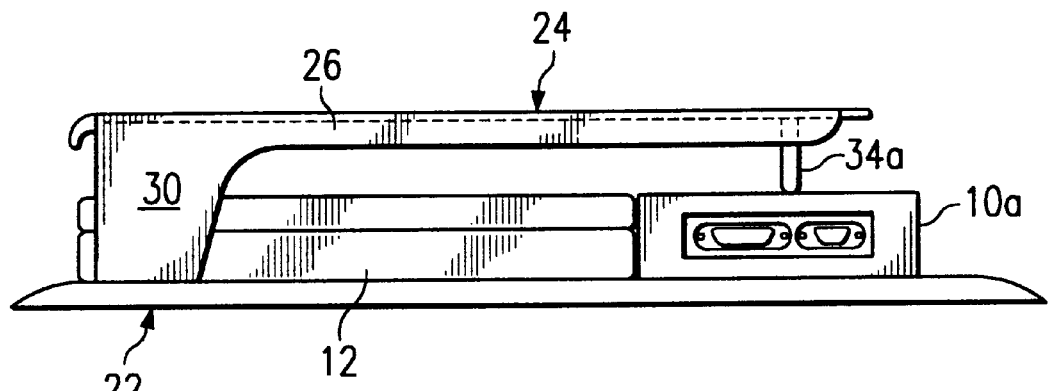
FIG. 3 is a view similar to FIG. 2 but depicting the stand and the portable computer of FIG. 2 in use with a docketing device that is smaller than the docking device of FIGS. 1 and 2.

The monitor stand 20 is easily adjustable to accommodate docking devices of different heights. For example, FIG. 3 depicts a docking device 10a that is smaller than the docking device 10 and is positioned and mounted relative to the stand 20 in the same manner as the docking device 10 of FIGS. 1 and 2. In order to maintain the horizontal orientation of the plate 26 and accommodate the lower height of the docking device 10a, the legs 34 and 36 are replaced by longer legs, one of which is shown by the reference numeral 34a in FIG. 3.

Of course, if it is desired, for whatever reason, to adjust the orientation of the plate 26 and therefore the monitor viewing angle while using the same docking device 10, the legs 34 and 36 can simply be replaced by legs having a height compatible with the desired viewing angle.

Figure 4:
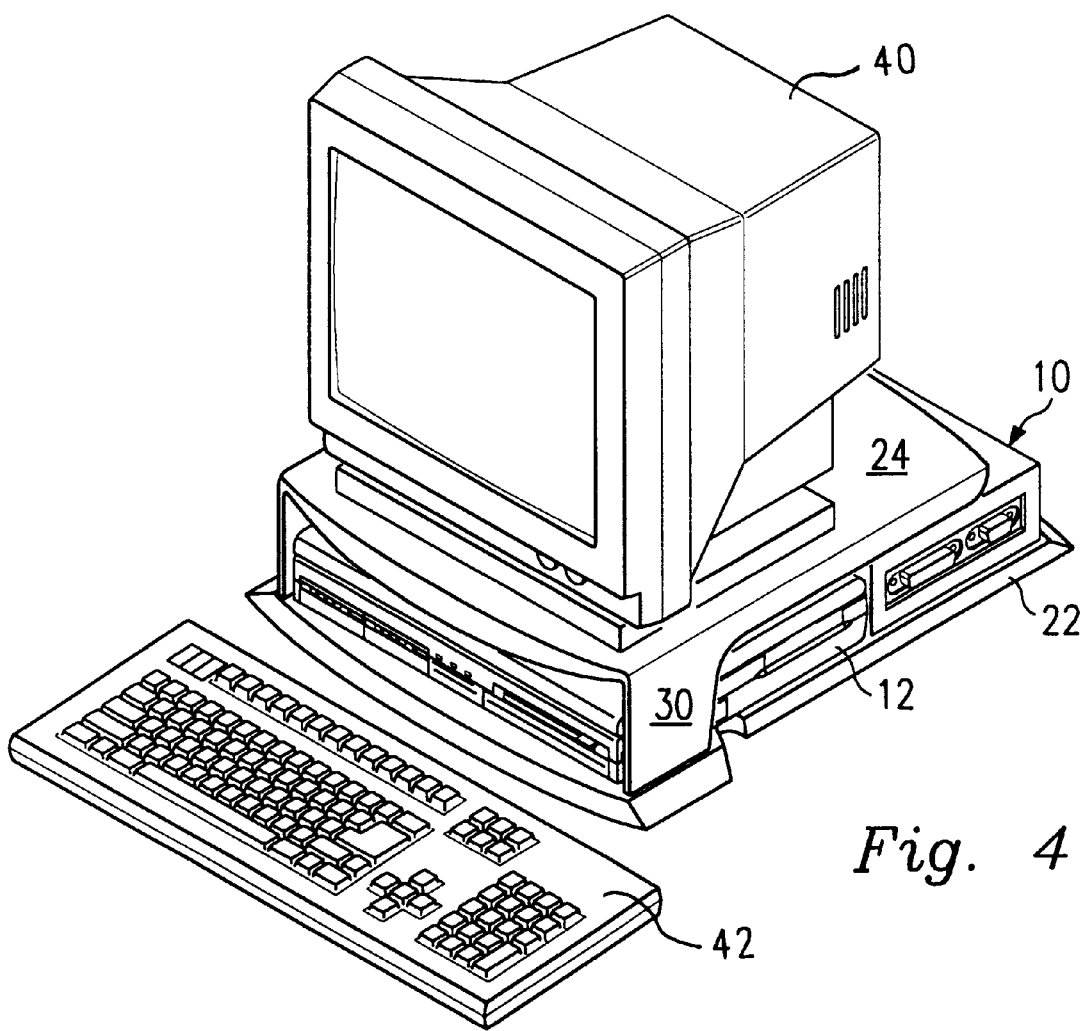
FIG. 4 is an isometric view depicting the stand, the docking device and the portable computer of FIG. 3 along with a monitor and a keyboard.

The assembly of FIG. 3 is shown in use with a monitor 40 in FIG. 4. The monitor 40 rests on the upper surface of the upper support member 24, and, although not shown in the drawings, it is understood that cabling is provided to connect the docking device 10, and therefore the portable computer 12 to the monitor. A keyboard 42 is also provided and is connected to the portable computer in the same manner, and it is also understood that a mouse (not shown) can be provided.

Several advantages result from the monitor stand of the present disclosure. For example, the viewing height of the monitor is adjustable by the user to accommodate different docking devices and/or to attain a particular viewing angle. Also, the upper support member 24 can be fabricated of a relatively thin metal and is fairly easy and inexpensive to manufacture.

It is understood that variations may be made in the foregoing without departing from the scope of the invention. For example the number of interchangeable feet provided on the stand can be varied within the scope of the invention. Also, the feet can be provided on the upper surface of the docking device 10 rather than on the lower surface of the plate 26. Further, the internal reinforcing structure of the docking device can take other forms such as a relatively large boss, or the like.

It is also understood that the disclosure described above is intended to illustrate rather than limit the invention, and that it take many other forms and embodiments within the scope of the invention.

What is claimed is:

1. A computing assembly comprising a first support member; a docking device for resting on the first support member and comprising an enclosure; a computer for resting on the first support member in electrical engagement with the docking device; and a second support member comprising a plate and at least one foot attached to the plate for engaging the upper surface of the docking device, the foot being detachably connected to the plate for enabling the foot to be replaced by a foot of a different dimension to adjust the position of the plate; and a monitor resting on the plate so that the adjustment of the plate adjusts the viewing angle of the monitor, the docking device further comprising a support member disposed in the enclosure and directly underneath the foot to transfer the load from the plate and the monitor, and through the foot.

2. The assembly of claim 1 wherein there are two feet attached to the plate for engaging the upper surface of the docking device and wherein there are two support members disposed in the enclosure and directly underneath the feet, respectively.

3. A computing assembly comprising:
   a first support member having two end portions;
   a docking device disposed at one end portion of the first support member; and
   a second support member comprising:
      a plate, at least one foot attached to the plate and engaging the upper surface of the docking device, the foot being detachably connected to the plate for enabling the foot to be replaced by a foot of a different dimension to adjust the position of the plate, and
      a leg in a spaced relation to the foot and engaging the second end portion of the first support member, the leg and the foot maintaining the second support member in a
      vertically-spaced relation to the first support member for defining a space;
   a computer extending in the space and in electrical engagement with the docking device; and
   a monitor resting on the plate so that the adjustment of the plate adjusts the viewing angle of the monitor.

4. The assembly of claim 3 wherein there are two laterally spaced feet and two laterally spaced legs.

5. The assembly of claim 4 wherein the computer extends between the legs and the legs guide the computer onto the first support member.

6. In combination, a docking member comprising an enclosure, and a support bridge on the enclosure; a plate extending over the enclosure; a first foot extending between the support bridge and the plate to support the plate a distance from the enclosure; a second foot for extending between the support bridge and the plate in place of the first foot to support the plate another distance from the enclosure; and a monitor supported on the support plate so that the load from the monitor is transferred through the support plate, the foot, and the support bridge.

7. The combination of claim 6 wherein the respective lengths of the first foot and the second foot vary to vary the distances.

8. The combination of claim 6 further comprising a tray for receiving the docking member and a computer for docking with the docking member.

9. The combination of claim 8 wherein the plate extends over the tray.

10. The combination of claim 9 wherein the angle of the plate, and therefore the monitor, relative to the tray is changed by replacing one foot with the other.

11. The combination of claim 9 wherein the plate comprises at least one leg extending in a spaced relation to the foot and engaging the tray, the leg and the foot maintaining the plate in a vertically-spaced relation to the tray for defining a space for receiving the docking member and a computer for docking with the docking member.

12. The combination of claim 11 wherein the length of the tray is greater than that of the enclosure, and wherein the leg engages a portion of the tray not occupied by the enclosure.

13. The combination of claim 11 wherein there are two spaced legs between which the computer extends, and wherein the legs guide the computer onto the tray.

14. The combination of claim 11 wherein the tray has at least one slot formed therein for receiving the leg to align and secure the plate to the tray.

15. A computing assembly comprising a computer; a docking member comprising an enclosure for receiving the computer in a docking relationship, and a support bridge on the enclosure; a plate extending over the enclosure; a first foot extending between the support bridge and the plate to support the plate a distance from the enclosure; a second foot for extending between the support bridge and the plate in place of the first foot to support the plate another distance from the enclosure; and a monitor supported on the plate so that the load from the monitor is transferred through the plate, the foot, and the support bridge.

16. The assembly of claim 15 wherein the respective lengths of the first foot and the second foot vary to vary the distances.

17. The assembly of claim 15 further comprising a tray for receiving the docking member and the computer.

18. The assembly of claim 17 wherein the plate extends over the tray.

19. The assembly of claim 18 wherein the angle of the plate, and therefore the monitor, relative to the tray is changed by replacing one foot with the other.

20. The assembly of claim 18 wherein the plate comprises at least one leg extending in a spaced relation to the foot and engaging the tray, the leg and the foot maintaining the plate in a vertically-spaced relation to the tray for defining a space for receiving the docking member and the computer.

21. The assembly of claim 20 wherein the length of the tray is greater than that of the enclosure, and wherein the leg engages a portion of the first member not occupied by the enclosure.

22. The assembly of claim 20 wherein there are two spaced legs between which the computer extends, and wherein the legs guide the computer onto the tray.

23. The assembly of claim 20 wherein the tray has at least one slot formed therein for receiving the leg to align and secure the plate to the tray.

* * * * *

UNITED STATES PATENT AND TRADEMARK OFFICE
CERTIFICATE OF CORRECTION

| | | |
|---|---|---|
| PATENT NO. | : 6,049,454 | Page 1 of 1 |
| DATED | : April 11, 2000 | |
| INVENTOR(S) | : Bryan Howell, Orin Ozias, Bryan Hunter, Peter Skillman, John W. Lai and Tracy Angela Neist | |

It is certified that error appears in the above-identified patent and that said Letters Patent is hereby corrected as shown below:

Column 1,
Line 3, insert the following paragraphs:

--      TECHNICAL FIELD

The present disclosure relates to a computer monitor stand and, more particularly, to a computer monitor stand for use in connection with a docking device for a portable computer.

BACKGROUND

Portable computers, such as notebook computers, laptop computers, and other similar types of computers are becoming more and more popular due to their ability to be used in non-office environments. In this context, optional docking devices, such as docking stations, port replicators, etc. are usually available to enable the portable computer to be easily interfaced with certain peripheral equipment, such as, monitors, printers, modems, etc., so that the portable computer can quickly be adapted for office use. These docking devices are designed to connect the portable computer to the peripheral equipment, while permitting the portable computer to be undocked and taken away. --

Signed and Sealed this

Tenth Day of December, 2002

JAMES E. ROGAN
*Director of the United States Patent and Trademark Office*